Jan. 5, 1943.  R. O. ANDERSON  2,307,187
SHOCK ABSORBING COUPLING
Filed Dec. 23, 1939  9 Sheets-Sheet 1
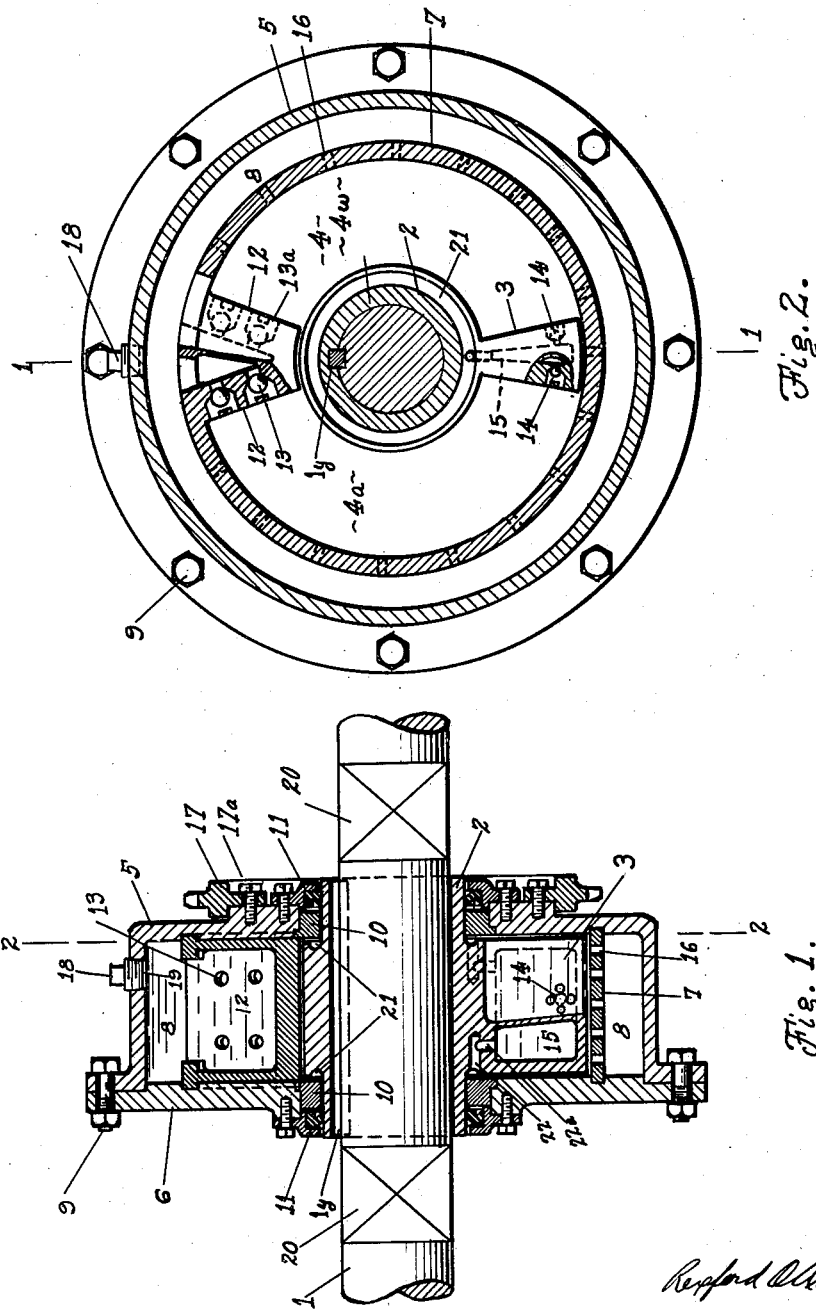
Rexford O. Anderson
INVENTOR.
BY E. V. Hardway
ATTORNEY Jan. 5, 1943.  R. O. ANDERSON  2,307,187
SHOCK ABSORBING COUPLING
Filed Dec. 23, 1939  9 Sheets-Sheet 2
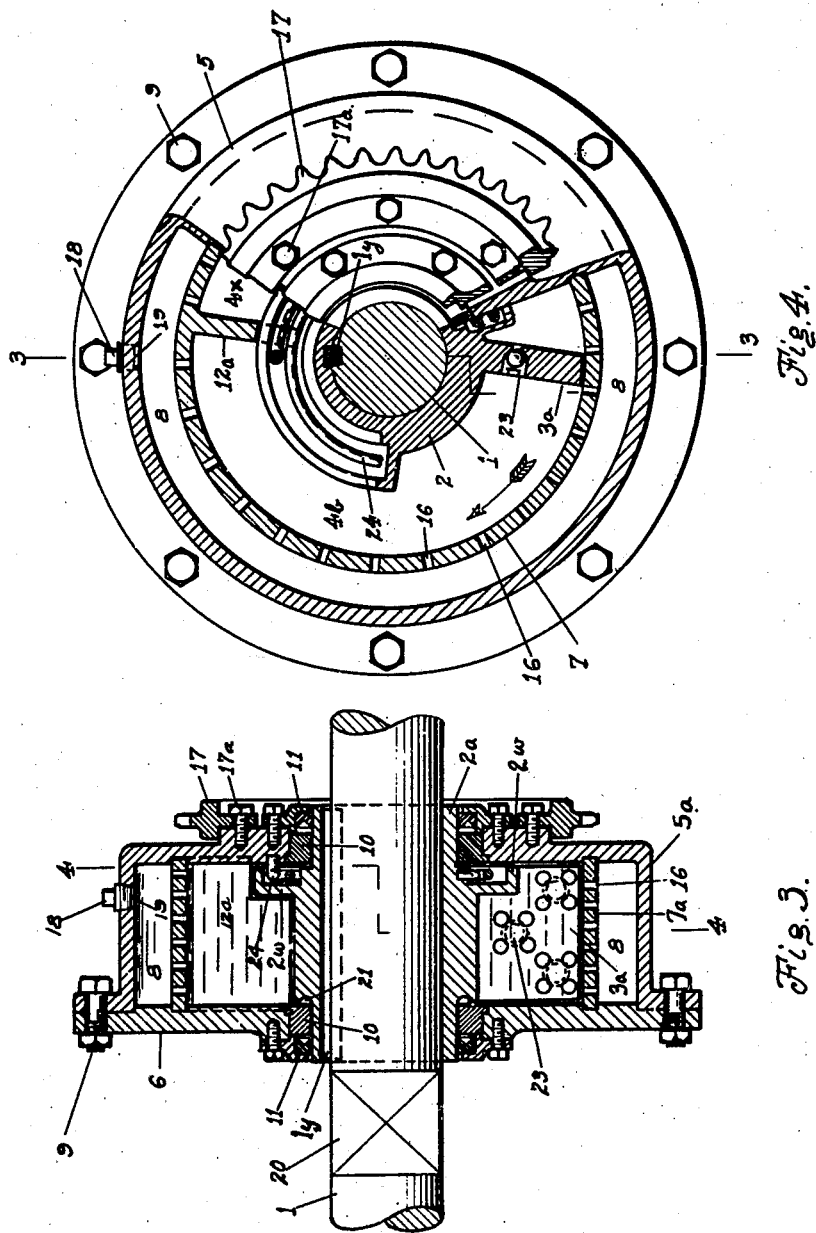
Rexford O. Anderson
INVENTOR.
BY E. V. Hodway
ATTORNEY

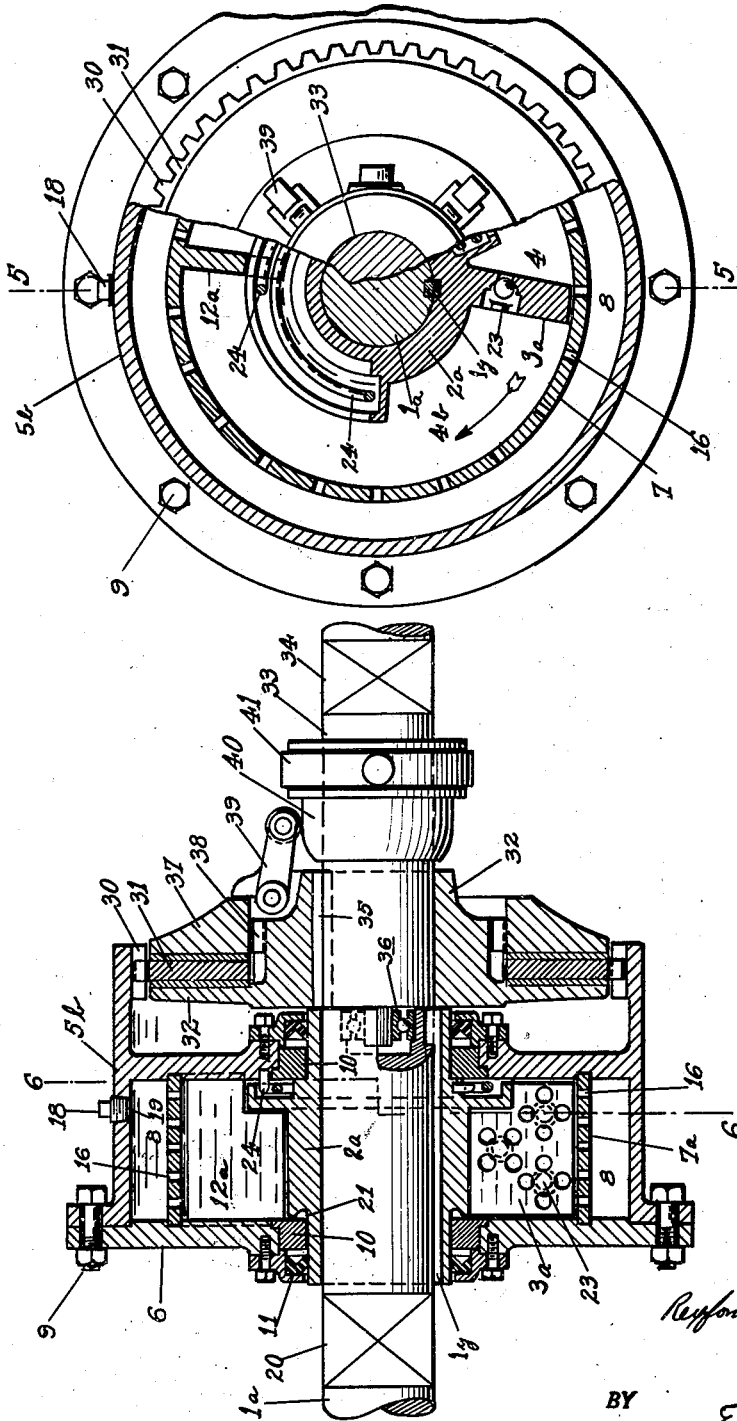

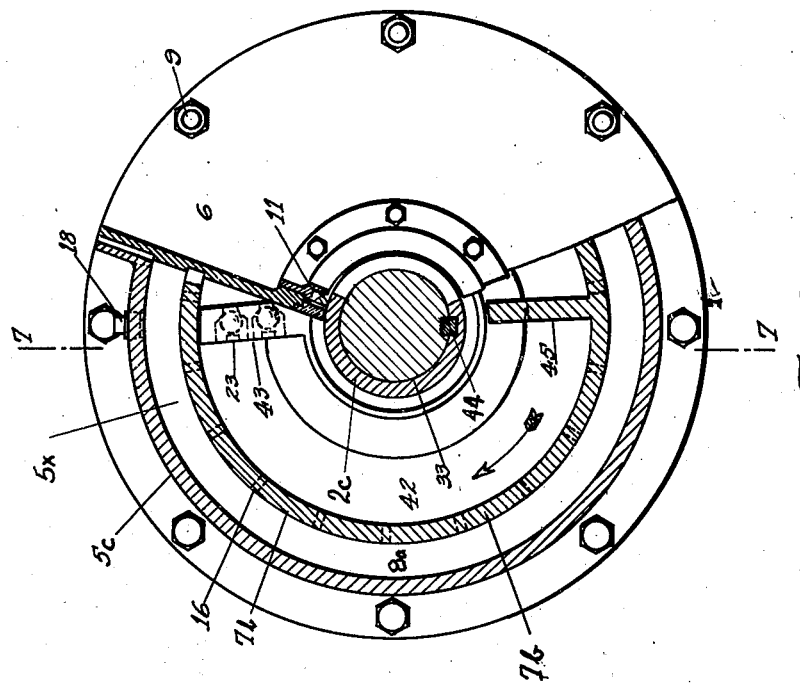
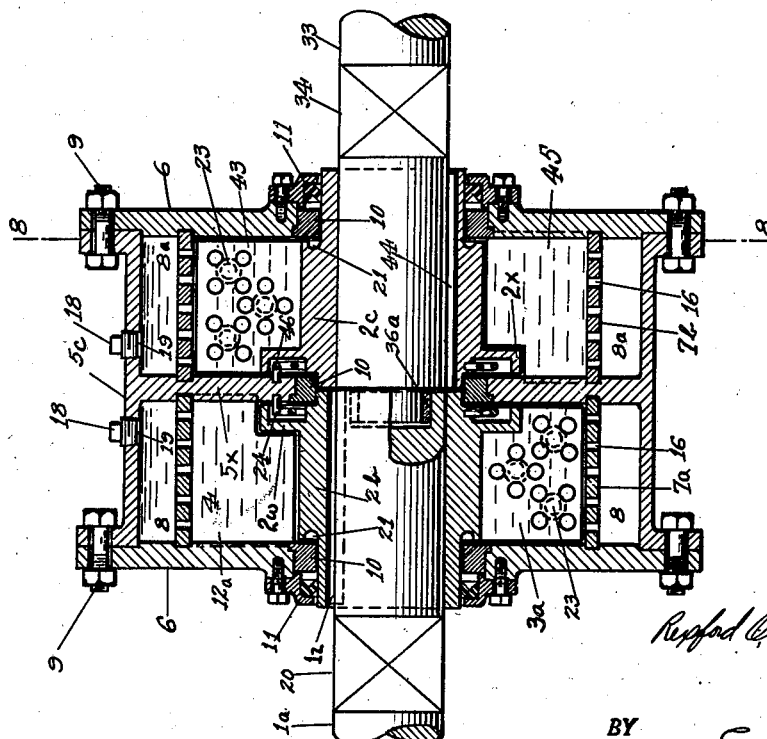

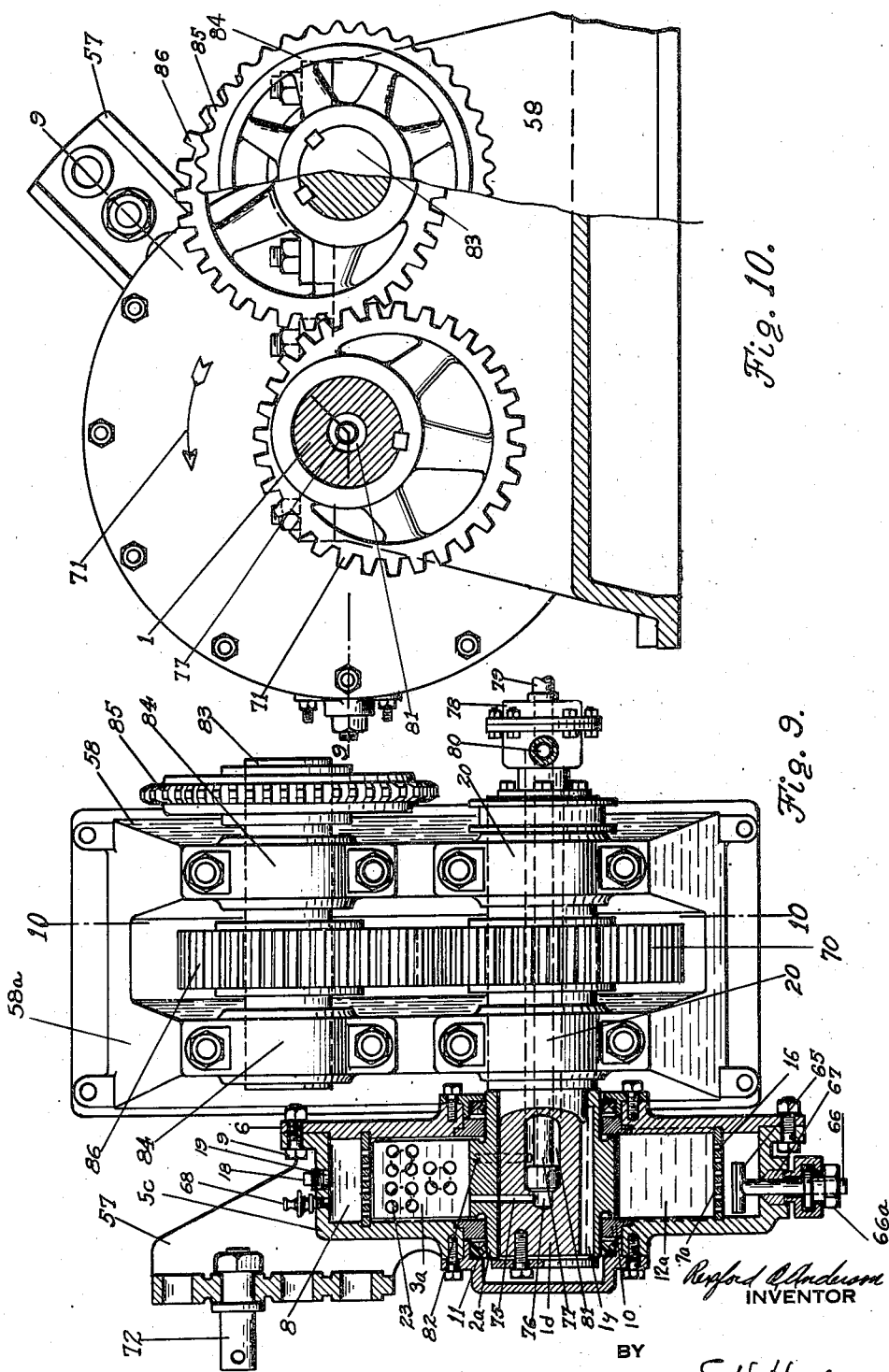

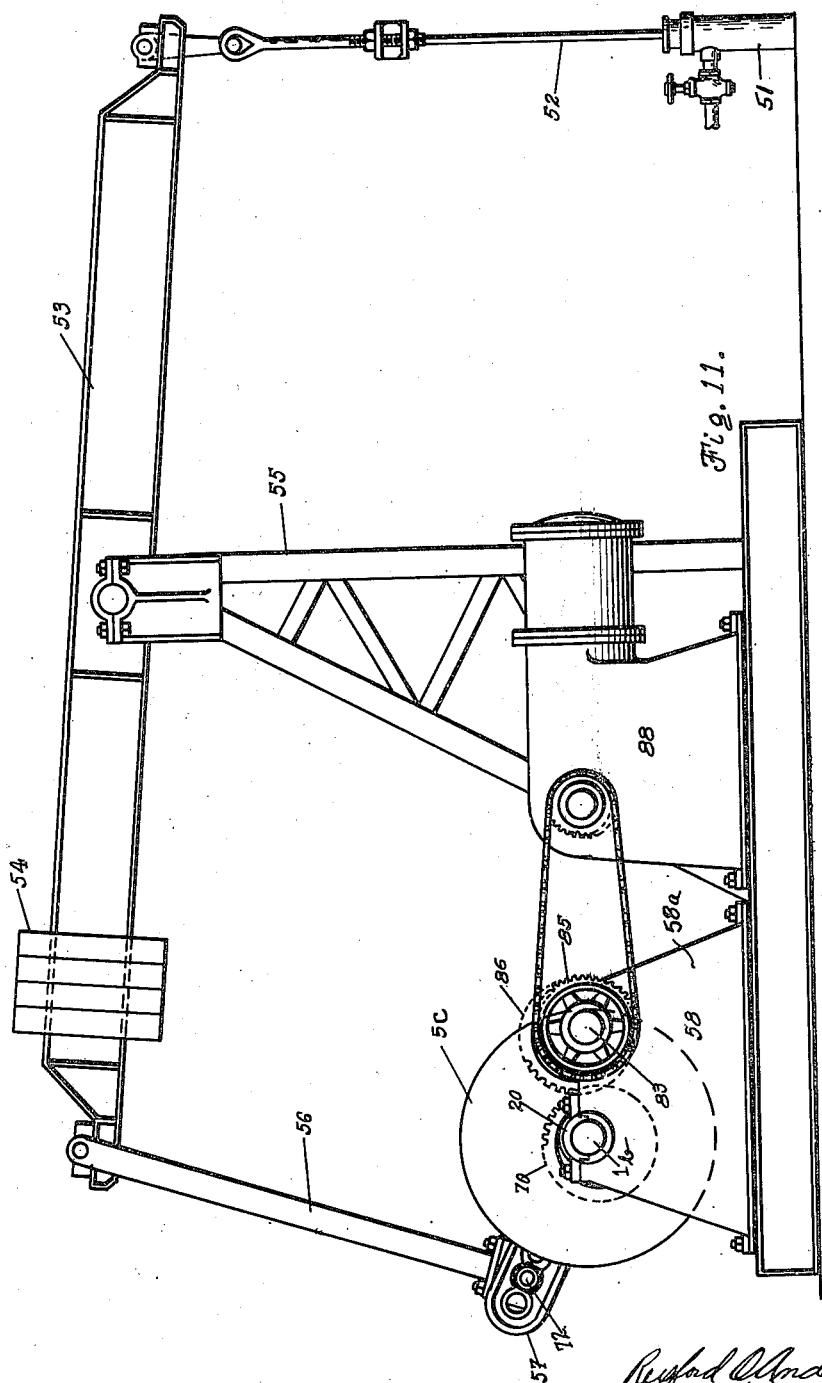

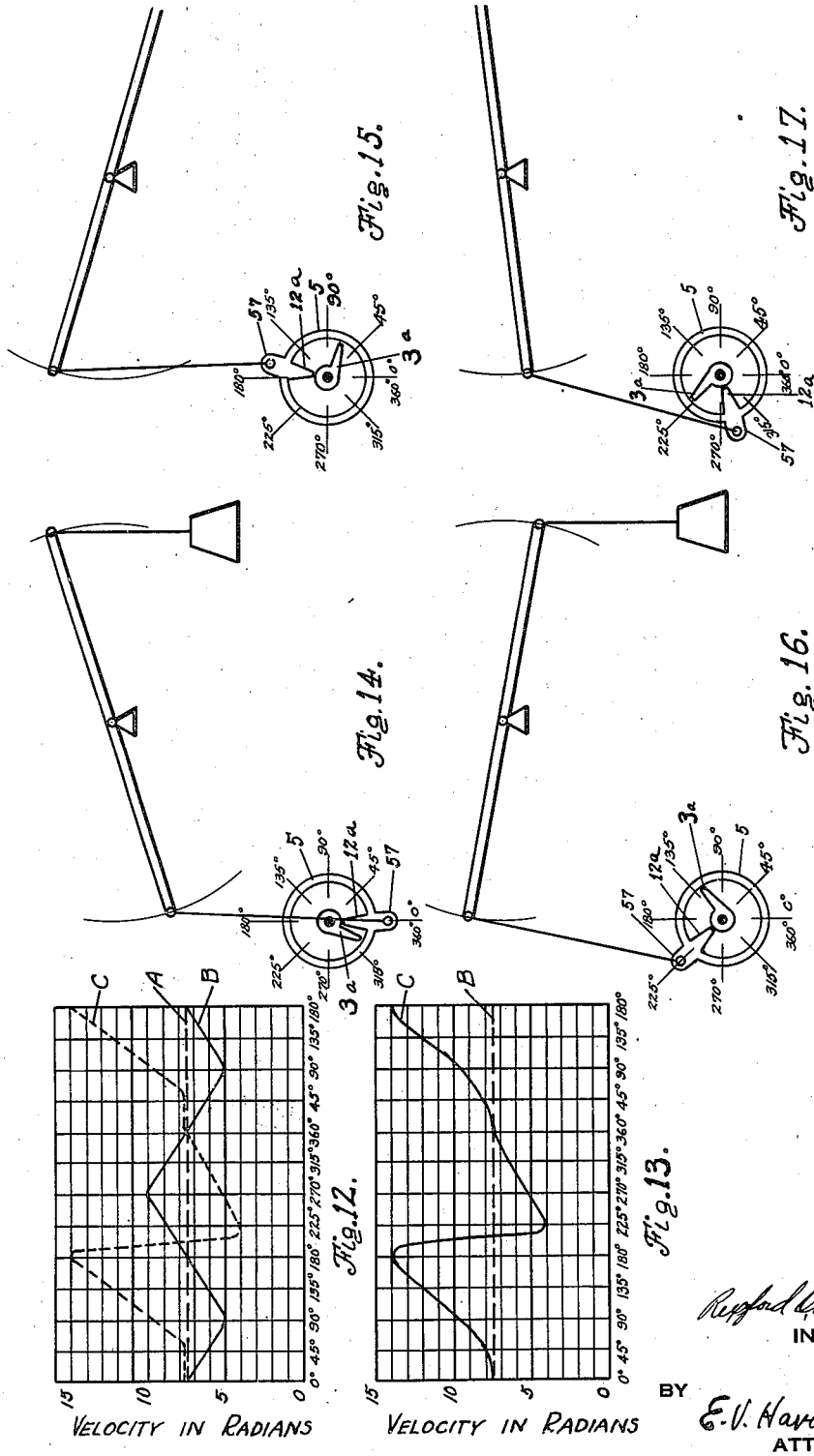

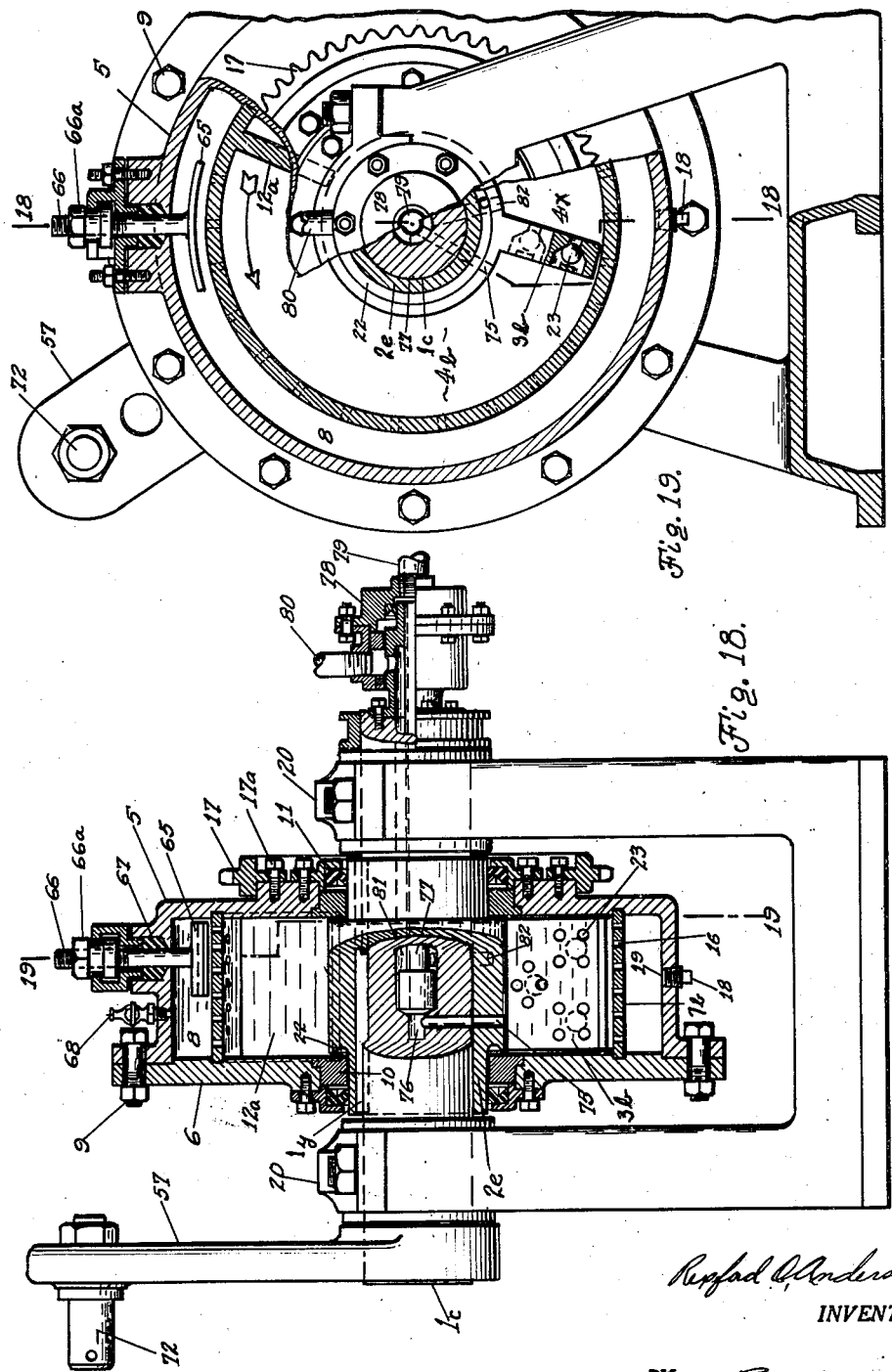

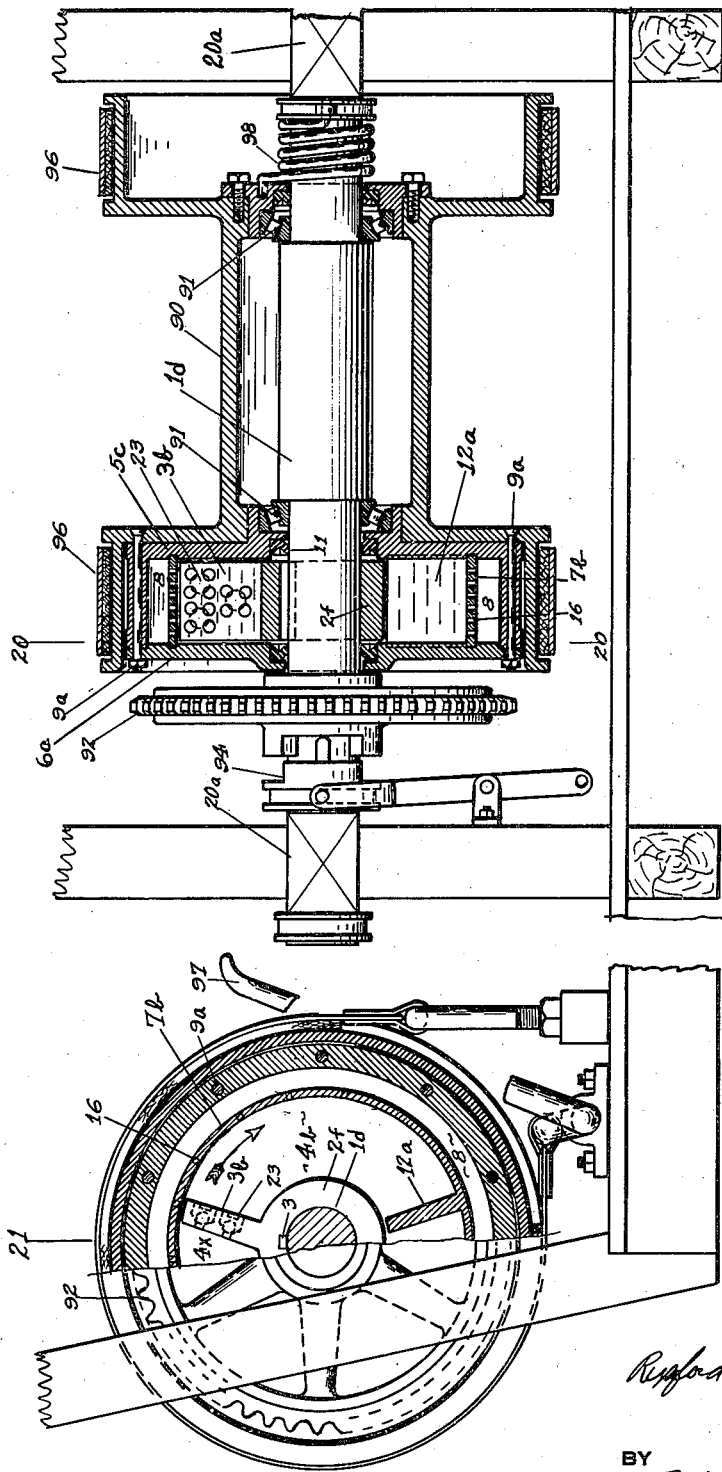

Patented Jan. 5, 1943

2,307,187

UNITED STATES PATENT OFFICE 2,307,187

SHOCK ABSORBING COUPLING

Rexford O. Anderson, Oklahoma City, Okla.

Application December 23, 1939, Serial No. 310,740

5 Claims. (Cl. 64—26)

This invention relates to a shock absorbing coupling.

An object of the invention is to provide a coupling which operatively connects two rotating members by gradual application of torque force from the driving to the driven rotating member.

Another object of the invention is to provide a coupling for connecting two rotating members which prevents sudden torque forces from being transferred from one of said members to the other member.

Another object of the invention is to provide a coupling for connecting two rotating members with coupling elements which have damped movement, relative to each other, said elements being connected respectively to the members whereby sudden torque forces will not be transferred from one member to the other member by said coupling.

Another object of the invention is to provide a coupling for connecting two rotating members including coupling elements which have damped movement, relative to each other, said elements being connected respectively to the members whereby sudden torque forces will not be transferred from one member to the other member, said parts being arranged to positively engage at termination of said movement to thereby connect the members for positive drive.

Another object of the invention is to provide a coupling for connecting two rotating members having relatively oscillatable parts which are respectively connected to the members, said parts being movable into abutting relationship to positively transfer torque forces from one member to the other member, said coupling being also provided with hydraulic means for damping the movement of the parts into abutting driving or relationship whereby the driven member will be gradually rotatably connected with the driven member, and yieldable means being provided to urge the parts into spaced relationship when torque forces are not being transferred from one member to the other member by the coupling.

Another object of the invention is to provide a shock absorbing coupling which is rugged and simple in construction, and inexpensive to manufacture.

With the above and other objects in view the invention has particular relation to certain novel features of construction, operation and arrangement of parts, examples of which are illustrated in the accompanying drawings, wherein—

Figure 1 shows a vertical, sectional view of the coupling taken on the line 1—1 of Figure 2.

Figure 2 shows a sectional view taken on the line 2—2 of Figure 1.

Figure 3 shows a sectional view of another embodiment of the invention taken on the line 3—3 of Figure 4.

Figure 4 shows an end view of Figure 3, partly in section, taken on the line 4—4 of Figure 3.

Figure 5 shows a sectional view of a modified form of the invention disclosed in Figure 3, taken on line 5—5 of Figure 6.

Figure 6 shows an end view of Figure 5, partly in section, taken on line 6—6 of Figure 5.

Figure 7 shows a sectional view of another embodiment of the invention taken on the line 7—7 of Figure 8.

Figure 8 shows an end view of Figure 7, partly in section, taken on the line 8—8 of Figure 7.

Figure 9 shows a plan view of another embodiment of the invention with the coupling shown in section taken on the line 9—9 of Figure 10.

Figure 10 shows an end view of Figure 9, partly in section, taken on the line 10—10 of Figure 9.

Figure 11 shows a side elevation of a well pumping unit in which the form of the invention as described in Figures 9 and 10 is used.

Figure 12 shows a chart giving the characteristics of operation of the form of the invention shown in Figures 9 through 11.

Figure 13 shows a chart giving the characteristics of the operation of the form of the invention shown in Figures 18 and 19.

Figure 14 shows a diagrammatic view of the form of the invention disclosed in Figures 9 through 11 showing relative positions of the elements.

Figure 15 shows a diagrammatic view with the elements in another position.

Figure 16 shows a diagrammatic view with the elements in another position.

Figure 17 shows a diagrammatic view with the elements in another position.

Figure 18 shows a sectional view of a modified form of the invention embodied in Figures 9 through 11, taken on line 18—18 of Figure 19.

Figure 19 shows an end view of Figure 18, partly in section, taken on line 19—19 of Figure 18.

Figure 20 shows an end view of Figure 21, partly in section, taken on line 20—20 of Figure 21, and Figure 21 shows another embodiment of the invention, partly in section, taken on line 21—21 of Figure 20.

Referring now more particularly to the drawings wherein like numerals of reference designate the same parts in each of the figures; the housing is cylindrical in shape, being formed of a shell body 5 which has a radial wall and an overturned peripheral wall. Connected to the end of the peripheral wall by means of bolts 9 is the shell cover 6 which extends radially inwardly to a bearing 10. A corresponding bearing 10 is positioned against the inner margin of the radial wall of the shell body 5. The bearings 10, 10 are mounted on a hub 2 which is keyed to the shaft 1 by means of a key 1y. Positioned around the hub and connected to the shell body and shell cover are suitable sealing elements 11, 11 to prevent the escape of fluid from the housing. A plug 18 is provided for filling and draining the housing.

Within the housing is an annular partition 7 mounted in grooves in the radial wall of the shell body 5 and cover 6. This annular partition forms an outer chamber 8 and an inner chamber 4 within the housing. The partition is perforated as at 16. As shown in Figure 2 the partition 7 has a baffle 12 formed therein in which are mounted check valves 13, 13a through which fluid may pass from the outer chamber 8 into the inner chamber 4. This baffle 12 extends radially inwardly into close proximity with the hub 2. The impeller 3, which is positioned in the inner chamber, close to the shell body, shell cover and partition, is formed integrally with the hub 2a.

The housing is filled with liquid so it is necessary to provide a means for returning liquid from around the bearings into the housing and outer chamber 8. This is accomplished by means of circumferential grooves 21 in the hub which communicate with the chamber 15, formed in the impeller 3, by means of the ducts 22, 22a. Liquid is relieved from the chamber 15, by the check valve 14, into the inner chamber 4.

In operation, the coupling may be driven by the shaft 1 which is mounted in suitable bearings 20 and the coupling may drive a load by a chain to the sprocket 17 mounted on the shell body by means of cap screws 17a. As the shaft 1 rotates clockwise the impeller 3 is rotated within the inner chamber 4 which causes the pressure of the liquid on the forward side of the impeller to rise. However, the pressure will rise slowly as the ports 16 allow liquid to be relieved from the inner chamber 4a around through the partition and outer chamber 8 and back into the inner chamber 4w on the other side of the impeller 3. Also, as the impeller moves closer to the partition 12 as it rotates, there are less holes 16 so the fluid pressure within the inner chamber will rise. This fluid pressure acting against the partition 12 causes the shell body and sprocket 17 to rotate and as the impeller moves closer to the partition the rotative speed of the shell body will approach that of the impeller. Then as the liquid escapes from between the impeller 3 and partition 12 the impeller will move into abutting relationship therewith and a positive drive will be completed between the shaft 1 and sprocket 17. It can be seen that the check valves 13, 13a form ports through which a low pressure inner chamber may be filled. As hereinabove described, any fluid which has leaked around the bearings is drained into the chamber 15 or thrown therein by centrifugal force. The check valves 14 allow this liquid to drain from the chamber 15 into either inner chamber 4a or 4w according to which inner chamber is the lower pressure chamber at that instant.

Figures 3 and 4 disclose the coupling which includes the shell body 5a, shell cover 6, partition 7a and the container formed by the shell cover and shell body, and hub 2a keyed to the shaft 1. The partition 12a is solid and the impeller 3a has check valves 23 which allows the flow of liquid through the impeller. The hub has a housing 2w formed at one end thereof and mounted in the housing is a spring 24, one end of which is connected to the body and the other end being connected to the hub.

In this embodiment of the invention the action is substantially the same as that described with reference to Figures 1 and 2, however, in this form it is contemplated that there be no reversals in direction of rotation of the members, merely intermittent rotation. As the shaft 1 is rotated in a clockwise direction, fluid pressure is built up within the inner chamber 4b which acts on the partition 12a to cause the shell body to rotate. This action also stores energy in the coil spring 24 so that the impeller 3a will return to its original position in abutting relation with the rear side of the partition 12a when no torque load is being carried by the coupling. The check valve 23 in the impeller 3a allows free movement of liquid therethrough so that the spring 24 may more easily return the impeller to its position at the rear of the baffle 12.

Figures 5 and 6 portray a form of the invention adapted for use with a friction clutch. Power is introduced through the drive shaft 1a, supported by the bearing 20. The power is transmitted to the shell body 5b and cover 6 as described above in reference to the form of the invention shown in Figures 3 and 4. The shell body 5b has an extended skirt with the internal gear teeth 30 formed therein, which mesh with mating teeth in the friction plate 31; so that the said friction plate rotates with the shell. The clutch body 32 is keyed to the driven shaft 33 by means of the key 35, and is supported in the bearing 34. The shaft 33 is aligned with, and supported in the shaft 1a by the bearing 36. The clutch operating disc 37 is rotated with the clutch body 32, by means of the splines 38, and is moved longitudinally to engage the clutch by means of the fingers 39, said lever being actuated by the follower cam 40 through the clutch yoke 41.

In order to disengage the clutch the follower cam 40 is thrown back so that the friction plates 31 are free to rotate relative to the clutch body 32, and operating disc 37. The coupling shell body 5 is, under these conditions, transmitting no power and, as described in connection with Figures 3 and 4, the spring 24 has drawn the impeller 3a to the no-load position adjacent the back of the baffle 12b. In order to transmit power to shaft 33 and the clutch yoke is operated to engage the clutch operating disc 37, and clutch body 32 with the friction plate 31, by means of pressure exerted by clutch fingers 39. The initial pressure on the friction plate causes the clutch and shaft 33 to start to rotate, which rotation is transmitted to the shell 5b. The rotative speed of the shell 5b is varied in proportion with the pressure of the liquid in chamber 4b. As before explained, with reference to Figures 3 and 4, the speed of the hub gradually approaches the speed of the shell body so that less slippage of the clutch parts are necessary; reducing the wear and heat to which they are ordinarily subjected to in the conventional clutch to gain the same power transmission.

Figures 7 and 8 portray a modified form of the invention adapted to be used as a coupling for the transmission of intermittent shock loads from a driving shaft to axially aligned driven shaft. The coupling includes a cylindrical shell body 5c having a transverse separating wall 5x formed integrally therewith. The ends of the shell body are closed by shell covers 6 which are attached to the shell body 5c by means of bolts 9. Mounted in grooves in the separating wall 5x and shell covers 6 are the annular partitions 7a, 7b which form outer chambers 8 and 8a and inner chambers 4 and 42, respectively, on both sides of said wall 5x. The partition 7a has a baffle 12a formed therein and the partition 7b has a corresponding baffle 45. The housing is mounted on hubs 2b and 2c which are keyed relative to the shafts 1a and 33, respectively, by the keys 13 and 44. There are suitable bearings 10 between the hubs and the shell covers 6, 6 and wall 5x. The shafts 1a and 33 are rotatably connected, as shown in Figure 7, by the pin on the end of the shaft 33 fitted into the bore of the shaft 1a and a suitable bearing material 36a which separates the shafts.

The hubs 2b and 2c have the housings 2w and 2x formed thereon which contain the springs 24 and 46. These springs are connected at one end to the wall 5x and at the other end to the hub. Formed integrally with the hubs 2b and 2c are the impellers 3a and 43, respectively, which have the check valves 23, 23 mounted therein. The coupling is filled with a liquid as oil or water by means of the plugs 18 and the seals 11, 11 connected to the shell covers 6 prevent the escape of said liquid from the coupling.

The operation of this form is substantially the same as described in reference to Figures 3 and 4, the spring 46 connecting the impeller 43 with the wall 5x acting as does the spring 24 to bring the impeller 3a back to back with its respective baffle 12a. The liquid within the inner chambers 4 and 42 being relieved into the outer chambers 8 and 8a causing a damping effect as hereinbefore described.

Figure 11 portrays the form of the invention as disclosed in Figures 9 and 10 adapted to be used as a pumping unit for a well in connection with a beam-sucker rod oil well pumping unit. The numeral 51 represents the casing extending out of a well bore. The numeral 52 represents the polish rod connecting the walking beam 53 with the sucker rod and pump in the well. The beam counterweights 54 act to counterbalance the load on the polish rod. The numeral 55 represents the sampson post on which the walking beam is pivotally supported. The pitman 56 connects the walking beam 53 with the crank 57 of the pumping power unit 58 by means of a crank pin 72. The crank 57 is connected to the shell body 5c of a coupling, which coupling is more specifically shown in Figure 9. The shaft 1b is mounted in a suitable bearing 20 and has the eccentric gear 70 keyed thereon. An impeller in the coupling shell body 5c is also connected to the shaft 1b. The line shaft 83 has a sprocket 85 and an eccentric gear 86 mounted thereon. The eccentric gear 86 mates with the gear 70 and the sprocket 85 is rotated by a suitable engine 88.

The pumping unit 58 is more particularly shown in Figures 9 and 10 as hereinafter described. The line shaft 83 is mounted in bearings, 84, 84 which are supported by the pedestal 58a. An eccentric gear 86 is keyed on the shaft 83 between the bearings 84, and the sprocket 85 is mounted on the extended end of the shaft. The shaft 1b is supported by bearings 20, 20 and has a gear 70 mounted thereon which meshes with the gear 86. On the extended end of the shaft 1b is mounted a coupling which operates in substantially the same manner as the couplings hereinbefore described.

The coupling includes a hub 2a keyed to the shaft by means of the key 1y with the impeller 3a integrally connected thereto. There is a shell body and shell cover rotatably mounted on the hub with an annular partition 7a therein. The coupling has the plug 18 mounted in the opening 19 for filling the clutch with liquid; and a cock 68 through which air may be expelled from within the clutch. There are suitable sealing elements 11 to maintain liquid within the clutch.

The crank is connected to the shell body 5c and a crank pin 72 is suitably mounted therein. It can be seen that the sprocket 85 drives the gears 86 and 70 which rotates the shaft 1b. The impeller 3a which is mounted on the shaft 1b transmits the torque load from the shaft 1b to the clutch body 5c in the manner herein before described with reference to the other illustrations. The crank 57 mounted on the shell body is thereby rotated to oscillate the walking beam 53 by means of the pitman 56.

In the operation of pumping a well, the beam weights 54 would not be sufficient to counterbalance the rod load. This would make it necessary to apply power from the impeller to the shell during half of a cycle, namely, that half when the rods and liquid were being raised and the crank and pitman were going down. After the load portion of the cycle is completed, and since the rotation speed of the impeller is fixed at this point, the unbalanced weight of the rods will accelerate the rotative speed of the shell, thus causing the relative positions of the impeller and baffle wall to change to form a space between them. In this way when the load portion comes again in the cycle, there is space between the impeller and baffle wall sufficient for an absorption of shock, through a displacement of the liquid as before described.

Figurest 9, 10 and 11 show a form of pumping unit in which greater working space between the impeller and baffle wall might be had during the no-load portion of the cycle. This is afforded by means of the eccentric gears 86 and 70, respectively. These gears give a variable rotative speed to the drive shaft 1a, with a constant rotative speed on line shaft 83. The gears are positioned on the shafts 1 and 83, in relation to the impeller 3a so as to afford a slow rotative speed of the impeller during the no-load part of the operating cycle. Figure 12 shows a chart portraying the speeds of the various elements between zero degrees and 360 degrees of an operative cycle, zero degrees to 180 degrees being the no-load portion of the cycle, and 180 degrees to 360 degrees being the load portion of the cycle. The abscissa designates the position in the cycle of the various elements while the ordinate portrays the speed in radians per unit of time. The curve "A" represents the speed of the line shaft 83, the same being constant, at—for example, 7½ radians per second. The curve "B" represents the speed of the drive shaft 1 and impeller 3a, which varies from 7½ radians per second at zero degrees, to 5 radians per second at 90 degrees, to 7½ radians per second at 180 degrees, to 10 radians per second at 270 degrees, and back to 7½ radians per second at 360 degrees, or zero degrees. Curve "C" represents the speed of the shell 5c and crank 57, which is 7½ radians per second, the same as the impeller, at zero degrees (see Figure 14). It remains constant to about 50 degrees, at which point the unbalanced load takes effect to accelerate the crank until at 180 degrees it obtains its greatest sped of 15 radians per second (see Figure 15). At this point the impeller 3a, whose speed is gradually diminishing, is at about 70 degrees. The inertia of the shell carries the crank on to approximately 195 degrees, at which time its velocity abruptly drops, and would become zero except for the action of the impeller 3a which starts exerting pressure on the baffle wall 12a through the liquid, and arrests the deceleration of the crank at 4 radians per second, at about 225 degrees, at which time (see Figure 16) the impeller 3a has reached 130 degrees in the cycle. Increased torque load on the crank, due to the angularity of the pitman, is compensated for by increased speed of the impeller 3a, which acts to give a slow gradual increase to the speed of the crank through the positions shown in Figure 17, until the speed of the crank approaches that of the impeller at 360 degrees, which is the end of the cycle. During each succeeding cycle the above described operation is repeated, the speed of the shell and crank varying each time with the prevailing loads on the polish rod 52.

Figure 13 shows the speed relations between the impeller 3a and the crank 57 with a constant speed of the impeller as designated by curve "B," and the speed of the crank designated by curve "C." The crank speed variations in this case is dependent on an unbalanced condition between the counterweights 54 and the polish rod load.

The action above described acts to allow a constantly varying speed to the polish rod throughout the cycle of operation. The speed at all times being dependent on the loads handled and the relative positions of the impeller and baffle wall, which governs the area of the orifices 16, and consequently the relative speed of the shaft and crank. These conditions vary during each succeeding cycle. In this way resonant stresses are broken up and shock loads are eliminated by differentials in the speeds of the impeller and shell. This speed differential takes place without the storing up of any energy to later be expended on the shell and act on the polish rod in the form of stresses.

Control of the speed differential between the impeller and shell is obtained by means of the arcuate regulating plates 65 (Figures 9, 18 and 19), which act to regulate to any degree the area of the perforations 16 in the annular partition 7a. The plate 65 is arcuate and may be of a suitable length. The plate is moved with relation to the partition 7a by means of the regulating valve stem 66 which is threaded to the regulating nut 66a which is suitably swiveled to the shell body 5c. A packing 67 is provided around the stem 66 to prevent the escape of liquid from the coupling.

There will be some heat generated through friction of the liquid passing through the holes 16. This heat will be dissipated by raising the temperature of the liquid circulated. Allowance is made for the dissipation of the heat absorbed by the operating liquid either to the atmosphere or other foreign cooling agent. As shown in Figures 9, 18 and 19 this is done by having a discharge port 75 leading from the inner chamber 4 at a point adjacent the face of the impeller 3b and connecting chamber 4 to the bore 76 in the shaft 1b of Figure 9 and 1c of Figure 18. The liquid passes under pressure through the tube 77 out through the manifold 78, thence through the discharge pipe 79 to a reservoir or cooler, not shown. Cool liquid is simultaneously drawn into the chamber 4 on the other side of the impeller 3a to displace that discharged. The cool liquid coming from the above-mentioned cooler, or reservoir, through the inlet pipe 80 into the manifold 78, passing in the annular space 81 outside the tube 77, through the inlet port 82 into the chamber at a point adjacent the back of the impeller 3a. In this way a small amount of the heated liquid is continually being discharged and cool liquid is being introduced during operation of the equipment, serving to carry off the heat of friction and maintain low temperature in the chambers 4x, 4b and 8.

Figures 18 and 19 portray a modified form of the invention which is adapted for use in a pumping unit. The crank 57 is attached to the shaft 1c and the shaft is supported in suitable upstanding bearings 20, 20. A coupling of the type hereinbefore disclosed is mounted between the bearings on the shaft. This coupling includes the shell body 5c and shell cover 6 forming a closed housing which is rotatably mounted on the hub 2e by means of the bearings 10. A sprocket 17 is connected to the shell body 5 by means of cap bolts 17a. The annular partition 7b has a transverse baffle 12a integrally connected thereto. The baffle 12a divides the inner chamber formed by the annular partition 7a into chambers 4b and 4x. The hub has an impeller 3b mounted thereon with check valves 23 therein. The rotative force is delivered to the coupling from a suitable source of power as the engine 88 to the sprocket 17. This rotates the shell body and baffle 12a raising the pressure of the fluid in the chamber 4b to cause the impeller 3b and shaft 1c to rotate. This form of the invention also embodies the regulating means for regulating the flow of fluid through the ports 16 and the annular partition 7a; as well as the means for circulating fluid into and out of the coupling to collect the same.

Figures 20 and 21 portray a modified form of the invention as adapted to a hoist, such as would be used in dragline ditching, and hoisting equipment. In this form of the invention the impeller 3b is keyed to the drive shaft 1d, mounted on the bearings 20a. The shell 5c is attached to the hoist drum 90, which is rotatably mounted to oscillate on the bearings 91. The shaft 1d is driven by means of the sprocket 92 through the clutch 94. The unwinding rotation of the hoist drum is controlled by the brake bands 96, through the brake lever 97. The drive shaft 1d and the hoist drum 90 are connected by the coil spring 98, which in times of no torque load between the shaft and drum, holds the shaft and drum in the position in which the back of the impeller 3b is adjacent to the back of the baffle wall 12a, as described in connection with the Figures 3 and 4.

In the operation of this form of the invention the chambers 4b, 4x and 8 are filled with the operating liquid. Power is applied to the sprocket 92, through the clutch 94, the shaft 1d, and to the impeller 3b. The load to be handled is attached to the drum 90 by means of a cable, not shown, wound thereon. The coil spring 98 has the shaft and drum positioned so that the shaft can rotate approximately a complete revolution relative to the drum before there is direct mechanical contact between the faces of the baffle wall 12a and the impeller 3b. The initial torque applied to the drive shaft 1d is transmitted to the liquid in the chamber 4b in the form of hydrostatic pressure. A portion of this torque energy goes to discharge the liquid from the chamber 4b through the holes 16 into the chamber 8, and back into chamber 4x, behind the impeller. The remainder of the torque energy in the form of hydrostatic pressure acts upon the baffle wall 12a to transmit torque to the hoist drum 90, and the load. The initial angular travel of the impeller 3b can be relatively extensive before the initial torque reaches the hoist drum 90. As it travels further the area of the holes 16 decreases and the hydrostatic pressure in the chamber 4b, between the impeller and baffle wall 12a, increases. This pressure then increases the torque on the hoist drum gradually, until such time as the impeller 3b comes in contact with the baffle wall 12a, and their velocities become equal, and the full torque is delivered through metal contact to the hoist drum and load.

When the load is raised and the brake bands 96 are set to relieve the shaft of the torque load, and the clutch 94 is disengaged, the spring 98 rotates the shaft in a reverse direction, forcing the liquid through the check valves 23 in the impeller and the holes 16 to the other side of the impeller 3b into the chamber 4x, allowing the backs of the impeller and baffle wall to come in contact. When the load is lowered by control of the brake bands, the drag of the shaft 1d also aids the spring 98 in the above operation, so that when the load is again raised the relative positions of the impeller and baffle wall are such that service of the liquid is available in absorbing the shock of the initial torque.

The above described operation of the invention relieves the mechanism and cable of the shock ordinarily present in hoisting operations. These shocks sometimes amount to as high as 300% of the load handled. The elimination of these shock loads will be of great service to industry.

The drawings and description are illustrative merely, while the broad principle of the invention will be defined by the appended claims.

What I claim is:

1. A coupling comprising a hub, a housing rotatable on the hub, an annular partition in the housing forming an inner and outer chamber, said coupling having passageways through which the inner and outer chambers are connected, an impeller mounted on the hub and a baffle in the housing forming a pressure chamber in the inner chamber, a fluid filling the housing, whereby relative movement of the impeller toward the baffle is resisted by fluid confined in the pressure chamber to cause the housing to move substantially in unison with the hub, said passageways, being adapted to allow fluid to be relieved from said pressure chamber to allow the baffle and impeller to move into abutting relationship to thereby positively operatively connect the baffle and impeller.

2. A coupling comprising a hub, a housing for confining a liquid rotatable about the hub, a partition in the housing forming a pressure chamber and a relief chamber, said partition having passageways through which the pressure and relief chambers are connected, an impeller mounted on the hub and a baffle in the housing forming a compression chamber in the pressure chamber, a fluid filling the housing, whereby movement of the impeller toward the baffle is resisted by fluid confined in the compression chamber to cause the housing to move substantially in unison with the hub, said passageways being adapted to allow fluid to be relieved from said high pressure chamber to allow the baffle and impeller to move into abutting relationship to thereby positively operatively connect the baffle and impeller.

3. A coupling comprising a hub, a housing for confining a liquid rotatable about the hub, a partition in the housing forming a pressure chamber and a relief chamber, said partition having passageways through which the pressure and relief chambers are connected, an impeller mounted on the hub and a baffle in the housing forming a compression chamber in the pressure chamber, a fluid filling the housing, whereby movement of the impeller toward the baffle is resisted by fluid confined in the compression chamber to cause the housing to move substantially in unison with the hub, said passageways being adapted to allow fluid to be relieved from said high pressure chamber to allow the baffle and impeller to move into abutting relationship to thereby positively operatively connect the baffle and impeller, and said coupling having relief passageways for the fluid from the relief chamber to allow substantially unimpeded movement of the impeller away from the baffle.

4. A coupling comprising a hub, a housing for confining a liquid rotatable about the hub, a partition in the housing forming a pressure chamber and a relief chamber, said partition having passageways through which the pressure and relief chambers are connected, an impeller mounted on the hub and a baffle in the housing forming a compression chamber in the pressure chamber, a fluid filling the housing, whereby movement of the impeller toward the baffle is resisted by fluid confined in the compression chamber to cause the housing to move substantially in unison with the hub, said passageways being adapted to allow fluid to be relieved from said high pressure chamber to allow the baffle and impeller to move into abutting relationship to thereby positively operatively connect the baffle and impeller, and yieldable means effective to automatically maintain said impeller and baffle in spaced relationship when no torque is transmitted by the coupling.

5. A coupling comprising a driving member, a driven member having limited relative rotation with respect to the driving member, an impeller on the driving member, a co-acting partition in the driven member, said coupling having an operating chamber between the impeller and partition and having a by-pass chamber with escapement ports connecting said chambers which are located in graduated relationship with the operating positions of the impeller and partition, liquid in said chambers whereby power is transmitted in augmenting degree through the liquid between the impeller and partition during said relative movement.

REXFORD O. ANDERSON.